(12) United States Patent
Schat

(10) Patent No.: US 11,100,219 B2
(45) Date of Patent: Aug. 24, 2021

(54) METHOD AND DEVICE FOR DETECTING A MALICIOUS CIRCUIT ON AN INTEGRATED CIRCUIT

(71) Applicant: NXP B.V., Eindhoven (NL)

(72) Inventor: Jan-Peter Schat, Hamburg (DE)

(73) Assignee: NXP B.V., Eindhoven (NL)

(*) Notice: Subject to any disclaimer, the term of this patent is extended or adjusted under 35 U.S.C. 154(b) by 142 days.

(21) Appl. No.: 16/417,858

(22) Filed: May 21, 2019

(65) Prior Publication Data

US 2019/0318083 A1 Oct. 17, 2019

Related U.S. Application Data

(63) Continuation-in-part of application No. 15/950,207, filed on Apr. 11, 2018, now Pat. No. 11,023,623.

(51) Int. Cl.
 *G01R 31/3177* (2006.01)
 *G01R 31/317* (2006.01)
 *G06F 11/26* (2006.01)
 *G06F 11/263* (2006.01)
 *G06F 21/55* (2013.01)

(52) U.S. Cl.
 CPC ......... *G06F 21/552* (2013.01); *G01R 31/317* (2013.01); *G01R 31/3177* (2013.01); *G01R 31/31707* (2013.01); *G06F 11/26* (2013.01); *G06F 11/263* (2013.01); *G01R 31/31724* (2013.01); *G06F 2221/034* (2013.01)

(58) Field of Classification Search
 CPC .......... G06F 21/71; G06F 21/85; G06F 21/56; G06F 21/566; G01R 31/317; G01R 31/31707; G01R 31/31724; G01R 31/3177; G01R 31/3181; G01R 31/31813
 See application file for complete search history.

(56) References Cited

U.S. PATENT DOCUMENTS

| 7,975,307 B2 | 7/2011 | Tkacik et al. |
| 8,726,112 B2 | 5/2014 | Rajski et al. |
| 2002/0093356 A1* | 7/2002 | Williams ....... G01R 31/318335 324/762.02 |

(Continued)

OTHER PUBLICATIONS

Tehranipoor, M. et al., "A Survey of Hardware Trojan Taxonomy and Detection," IEEE CS, 10-25 (Year: 2010).*

(Continued)

*Primary Examiner* — Ashokkumar B Patel
*Assistant Examiner* — D'Arcy Winston Straub
(74) *Attorney, Agent, or Firm* — Daniel D. Hill

(57) ABSTRACT

A method and device for detecting a malicious circuit on an integrated circuit (IC) device is provided. The method includes generating a plurality of test patterns on the IC. A scan test circuit and the plurality of test patterns are used to test don't care bits of a function under test on the integrated circuit. Scan out data from the scan test circuit is provided in response to the plurality of test patterns. The scan out data is stored in a memory on the integrated circuit. The scan out data is monitored over a predetermined time period. If it is determined that a characteristic of the scan out data has changed within the predetermined time period, an indication that a malicious circuit has been detected is output. The device includes circuitry for performing the method in the field.

20 Claims, 4 Drawing Sheets

(56) References Cited

U.S. PATENT DOCUMENTS

| | | | | |
|---|---|---|---|---|
| 2002/0124217 | A1* | 9/2002 | Hiraide | G01R 31/318547 714/726 |
| 2007/0220381 | A1* | 9/2007 | Huang | G01R 31/3177 714/724 |
| 2018/0348298 | A1* | 12/2018 | Bhagwat | G01R 31/31703 |

OTHER PUBLICATIONS

Li et al., "A Survey of Hardware Trojan Threat and Defense," Elsevier, 426-37 (Year: 2016).*

Abramovici, Miron, et al.; "Integrated Circuit Security New Threats and Solutions;" Proceedings of the Fifth Annual Workshop on Cyber Security and Information Intelligence Challenges and Strategies; Oak Ridge, TN, Apr. 13-15, 2009; doi>10.1145/1558607.1558671.

Basak, Abhishek, et al; "Security Assurance for System-on-Chip Designs With Untrusted IPs;" IEEE Transactions on Information Forensics and Security; Jul. 2017, vol. 12, Issue: 7; pp. 1515-1528; DOI: 10.1109/TIFS.2017.2658544.

Bernstein, Kerry; "Trusted Integrated Circuits (TRUST);" Defense Advanced Research Projects Agency; Internet: https://www.darpa.mil/program/trusted-integrated-circuits, Retrieved Apr. 10, 2018.

Bhunia, Swarup, et al.; "Protection Against Hardware Trojan Attacks: Towards a Comprehensive Solution;" IEEE Design & Test, vol. 30, Issue 3, May/Jun. 2013; pp. 6-17; DOI: 10.1109/MDT.2012.2196252.

Bhunia, Swarup, et al.; "Hardware Trojan Attacks: Threat Analysis and Countermeasures;" Proceedings of the IEEE, vol. 102, No. 8, Aug. 2014, pp. 1229-1247; DOI: 10.1109/JPROC.2014.2334493.

Chakraborty, Rajat Subhra, et al., "MERO: A Statistical Approach for Hardware Trojan Detection;" CHES '09 Proceedings of the 11th International Workshop on Cryptographic Hardware and Embedded Systems; Lausanne, Switzerland, Sep. 6-9, 2009; pp. 396-410.

Hicks, Matthew, et al.; "Overcoming an Untrusted Computing Base: Detecting and Removing Malicious Hardware Automatically;" 31st IEEE Symposium on Security and Privacy, p. 159-172; Oakland, California; May 2010.

IEEE 1149.10-2017 IEEE Standard for High-Speed Test Access Port and On-Chip Distribution Architecture; May 18, 2017; pp. 1-96.

Li, He; et al.; "A Survey of Hardware Trojan Detection, Diagnosis and Prevention;" 2015 14th International Conference on Computer-Aided Design and Computer Graphics (CAD/Graphics), pp. 173-180; DOI: 10.1109/CADGRAPHICS.2015.41; Aug. 29, 2015.

Merritt, Rick; "U.S. Paves Roads to Trusted Fabs;" EETimes; Jul. 11, 2017; Internet: https://www.eetimes.com/document.asp?doc_id=1331990.

Ray, Sandip, et al.; "System-on-Chip Platform Security Assurance: Architecture and Validation;" Proceedings of the IEEE; Jan. 2018, vol. 106, Issue: 1; pp. 21-37; DOI: 10.1109/JPROC.2017.2714641.

Adee, Sally; "The Hunt for the Kill Switch;" IEEE Spectrum, vol. 45, No. 5; May 2008, pp. 34-39; DOI: 10.1109/MSPEC.2008.450531.

Xiao, Kan, et al.; "BISA: Built-in Self-authentication for Preventing Hardware Trojan Insertion;" 2013 IEEE International Symposium on Hardware-Oriented Security and Trust (HOST); Jun. 2-3, 2013; pp. 45-50; DOI: 10.1109/HST.2013.6581564.

Fern, Nicole et al.; "Hardware Trojans Hidden in RTL Don't Cares—Automated Insertion and Prevention Methodologies;" 2015 IEEE International Test Conference (ITC); Anaheim, California, Oct. 6-8, 2015.

Hu, Wei et. Al.; Why You Should Care About Don't Cares: Exploiting Internal Don't Care Conditions for Hardware Trojans; ICCAD '17 Proceedings of the 36th International Conference on Computer-Aided Design; pp. 707-713; Irvine, California, Nov. 13-16, 2017.

U.S. Appl. No. 15/950,207; Inventor: Jan-Peter Schat; "Method for Triggering and Detecting a Malicious Circuit in an Integrated Circuit Device;" filed Apr. 11, 2018.

* cited by examiner

|  | FF1 | FF2 | FF3 | FF4 | FF5 | FF6 | |
|---|---|---|---|---|---|---|---|
| PATTERN 1 | 0 (CARE) | 1 (DON'TCARE) | 1 (DON'TCARE) | 0 (DON'TCARE) | 1 (CARE) | 0 (DON'TCARE) | 1st RUN |
| PATTERN 2 | 0 (DON'TCARE) | 1 (CARE) | 0 (DON'TCARE) | 1 (DON'TCARE) | 1 (DON'TCARE) | 1 (DON'TCARE) | 2nd RUN |

47

|  | FF1 | FF2 | FF3 | FF4 | FF5 | FF6 | |
|---|---|---|---|---|---|---|---|
| PATTERN 1 | 0 (CARE) | 1 (DON'TCARE) | 1 (DON'TCARE) | 0 (DON'TCARE) | 1 (CARE) | 1 (DON'TCARE) | 1st RUN |
| PATTERN 2 | 0 (DON'TCARE) | 1 (CARE) | 1 (DON'TCARE) | 1 (DON'TCARE) | 1 (DON'TCARE) | 1 (DON'TCARE) | 2nd RUN |

METHOD AND DEVICE FOR DETECTING A MALICIOUS CIRCUIT ON AN INTEGRATED CIRCUIT

RELATED APPLICATION

This is a continuation-in-part of application Ser. No. 15/950,207, filed Apr. 11, 2018, which is herein incorporated by reference.

BACKGROUND

Field

This disclosure relates generally to integrated circuits, and more particularly, to a method and device for detecting a malicious circuit on an integrated circuit.

Related Art

The risk from malicious software is a common problem that requires continuous efforts to resist. However, malicious hardware circuits implemented on an electronic device, such as an integrated circuit (IC), may also be a problem. The malicious circuits may be added to functional logic of an IC design without the semiconductor manufacturer's knowledge. The malicious circuits are commonly referred to as hardware trojans. The circuits may be added by, for example, intellectual property (IP) vendors, layout centers, or foundries. They can be used to, for example, disturb functionality, disclose secret keys, or open backdoors for other attacks.

The risk of hardware trojans has been growing in recent years due to increasing use of externally produced hardware, more outsourcing of fabrication processes, and increasing system complexity. Customers of semiconductor manufacturers have become aware of the risk of hardware trojans and have started to require semiconductor manufacturers to take appropriate security measures.

The risk of implementations of hardware trojans may be defended against by using only trusted IP providers, trusted layout centers and certified layout and verification tools. As these measures cannot provide complete safety against hardware trojans, it is desirable to be able to detect hardware trojans on the IC using dedicated test methods. To prevent detection, the hardware trojans may delay activation to escape detection during production testing. hardware trojan detection on ICs should thus include detection mechanisms for use in the field. While testing in the field for functional safety is widely used, testing in the field for hardware trojans detection is rarely used, and requires a different approach compared to a field test for functional safety.

Therefore, a need exists for a method to detect the presence of hardware trojans on ICs in the field.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates test patterns for use in triggering and detecting a malicious circuit in the integrated circuit device of FIG. 1.

DETAILED DESCRIPTION

Figure 1:
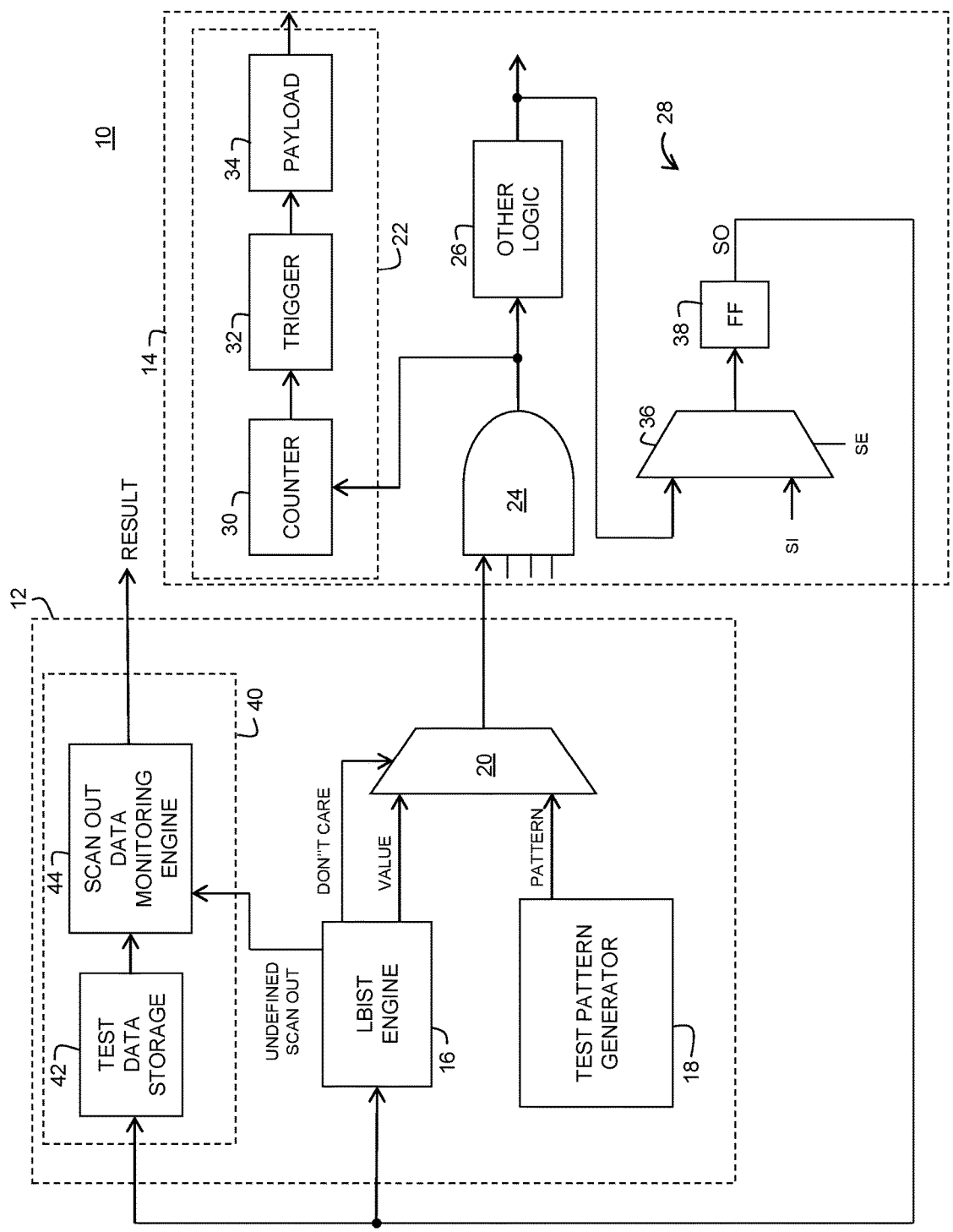
FIG. 1 illustrates an integrated circuit device in accordance with an embodiment.

Generally, there is provided, a method and device for detecting malicious circuits (hardware trojans) on the device. In one embodiment, the method may be performed in the field and after production testing using logic built-in self-test (LBIST) circuitry. In one embodiment, using the LBIST circuitry, test patterns are generated and provided to the LBIST circuitry of the IC. The plurality of test patterns includes "undefined" or "don't care" bits. A party responsible for implementing the hardware trojan may try to hide a trigger by using don't care bits of the IC design. The don't care bits are bits that do not generally influence an output value of a function under test. Conversely, "care" bits do influence an output of the function. Generally, in structural testing, the plurality of test patterns is not changed between runs of test patterns, where a run of test patterns is a set of test patterns. In normal functional testing, the runs typically do not include testing the undefined bits that are output from the functions under test. However, in the described embodiments, to trigger and detect a malicious circuit, the "don't care" bits are changed between runs. In one embodiment, the "don't care" bits are pseudo randomly changed between runs. Changing the "don't care" bits in the field is intended to trigger a malicious circuit that has been designed to delay activation to avoid detection during production testing and/or lab validation. During the testing in the field of the undefined bits, scan out data from the LBIST is stored in a memory on the device. A scan out data monitoring engine monitors the scan out data over a time period. A changed characteristic of the scan out data is used to detect when a malicious circuit is triggered. The monitoring of the scan out data includes a statistical analysis of undefined scan out data of the scannable logic to detect if a source of undefined scan out data has been modified by a malicious circuit payload. The payload may be, for example, for the purpose of sabotage, spying, inserting data into registers, opening backdoors, and stealing keys. The statistical analysis is performed on a stream of the undefined data from the scannable logic. The statistical analysis includes comparing one characteristic of the stream over time, or from one time period to another time period. The characteristic being monitored may include one or more of an average value of the stored scan out data, a correlation of the stored scan out data to the don't care bits, and an autocorrelation of the undefined scan out values over time. If the monitored characteristic indicates a difference in the data between the two time periods, then a malicious circuit, or "trojan" may have been triggered to cause the difference in data.

Malicious circuits are thus detected in the field, after production testing. The detected malicious circuit can then be disabled in a manner that does not compromise data security or personal safety.

In accordance with an embodiment, there is provided, a method for detecting a malicious circuit on an integrated circuit device, the method including: providing a plurality of test patterns, using a scan test circuit, to test don't care bits of a function under test on the integrated circuit; outputting scan out data from the scan test circuit in response to the plurality of test patterns; monitoring the scan out data over a predetermined time period, and determining if a characteristic of the scan out data has changed within the predetermined time period; and outputting an indication if a malicious circuit has been detected or suspected. The characteristic of the scan out data that is monitored within the predetermined time period may further include one or more of an average value of the stored scan out data, a correlation of the stored scan out data to the scanned in don't care bits, and an autocorrelation of the undefined scan out values over time. The don't care bits the plurality of test patterns may be generated pseudo-randomly. The scan test circuit may be a logic built-in self-test (LBIST) circuit. The method may be performed by a self-testing circuit on the integrated circuit after production testing and after the integrated circuit has been implemented in a product. The method may be performed by a self-testing circuit intermittently to an application running on the integrated circuit after the integrated circuit has been implemented in a product. The function under test may be one of a logic function, or mixed-signal function. Outputting the indication may further include disabling functionality of the integrated circuit.

In another embodiment, there is provided, a method for detecting a malicious circuit on an integrated circuit device, the method including: providing a plurality of test patterns, using a scan test circuit, to test don't care bits of a function under test on the integrated circuit; outputting scan out data from the scan test circuit in response to the plurality of test patterns; storing the scan out data in a memory on the integrated circuit; monitoring the scan out data over a predetermined time period, and determining if a characteristic of the scan out data has changed within the predetermined time period, wherein the characteristic includes one or more of an average value of the stored scan out data, a correlation of the stored scan out data to the don't care bits, and an autocorrelation of the undefined scan out values over time; and outputting an indication that a malicious circuit has been detected. The don't care bits of the plurality of test patterns may be generated pseudo-randomly. The scan test circuit may be characterized as being a logic built-in self-test circuit. The method may be performed by a self-testing circuit on the integrated circuit after the integrated circuit has been implemented in a product. The method may be performed by a self-testing circuit on the integrated circuit intermittently to an application running on the integrated circuit. The function under test may be one of a logic function or mixed signal function. Outputting the indication may further include disabling functionality of the integrated circuit.

In yet another embodiment, there is provided, a device including: a test pattern generator for providing a plurality of test patterns to test don't care bits of a function under test on the device; a scan test circuit for providing scan out data in response to the plurality of test patterns; a memory for storing the scan out data; and a scan out data monitoring engine coupled to the memory for determining if a characteristic of the scan out data has changed within a predetermined time period, and in response to detecting a change in the scan out data, providing an indication that a malicious circuit has been detected on the device. The characteristic of the scan out data that is monitored within the predetermined time period may further include one or more of an average value of the stored scan out data, a correlation of the stored scan out data to the don't care bits, and an autocorrelation of the undefined scan out values over time. The device may include one or more integrated circuits. The scan test circuit may be characterized as being a logic built-in self-test circuit. The test pattern generator provides a plurality of randomly generated test patterns.

FIG. 1 illustrates a simplified diagram of integrated circuit (IC) device 10 in accordance with an embodiment. Integrated circuit device 10 is illustrated with circuit blocks useful for describing various functions and aspects of the illustrated embodiment. For example, IC device 10 includes LBIST block 12 and functional logic 14. LBIST 12 includes LBIST engine 16, test pattern generator 18, multiplexer 20 and malicious circuit detection circuit 40. Functional logic 14 includes an example malicious circuit 22, AND logic gate 24, other logic 26, and scan chain portion 28. Malicious circuit 22 is illustrated as being part of functional logic 14 in FIG. 1. Malicious circuit detection circuit 40 includes test data storage 42 and scan out data monitoring engine 44. The manufacturer of IC device 10 may relatively easily recognize malicious circuit 22 as an intruder circuit and not belonging to the IC. However, a testing circuit, such as an automatic test pattern generator (ATPG) may consider malicious circuit 22 to belong to functional logic 14 because the ATPG tool may not be able to distinguish it from other functional logic. Example malicious circuit 22 includes counter 30, trigger circuit 32, and payload 34. Scan chain portion 28 is an output portion of a conventional scan chain for use with LBIST block 12. Scan chain portion 28 includes multiplexer 36 and scan flop 38. It is understood that an IC may have other functional blocks not illustrated in FIG. 1. The other functional blocks may be digital or mixed signal blocks. Examples of other functional blocks include, but are not limited to, processor(s), memory pages of random access memory (RAM), flash memory, and other types of non-volatile memory (NVM), an arithmetic logic unit (ALU), a debug interface, peripheral units such as a serial peripheral interface (SPI), controller area network (CAN), ethernet function block, and a DMA controller. In another embodiment, to test a memory, a memory BIST may be used for the malicious circuit detection. There may also be system control functionality such as power management and system clock adjustment, additional system cores and coprocessors, input/output (I/O) circuits, etc. (not shown).

A malicious circuit may take many forms. Malicious circuit 22 is just one possible of type of malicious circuit that may be implemented on an IC without the knowledge of the manufacturer of the IC device 10. Malicious circuit 22 is an example of a malicious circuit that is designed to have a delayed activation. In malicious circuit 22, to ensure that activation of the malicious circuit 22 does not occur prematurely, or before or during production testing of IC device 10, counter 30 may be included and coupled to the logic, such as at the output of AND logic gate 24. In the illustrated example, counter 30 will increment or decrement its value based on changes of the output of AND logic gate 24. Trigger circuit 32 will only trigger activation of malicious circuit 22 when a particular counter value is reached. In one embodiment, trigger circuit 32 is a "1-hot decoder". In another embodiment, the trigger may be based on analog values like aging, temperature, and/or digital values like register contents. Payload 34 performs a malicious behavior after being triggered, such as leaking secrets or blocking IC functionality. The output of payload 34 may be provided to an input/output circuit or other logic (not shown) depending on the purpose of malicious circuit 22. The secrets leaked may include, for example, encryption keys or passwords. Functional logic 14 may include synthesized logic that was first realized as a register-transfer level (RTL) design and implemented as registers and combinational logic on the integrated circuit device. Functional logic laid out on an IC may sometimes be referred to as a "sea-of-gates". Malicious circuit 22 may be implemented in RTL along with the functional logic. As malicious circuit 22 is implemented with a delayed trigger, malicious circuit 22 will essentially be invisible, or nearly invisible, to a production type of test. A test circuit may be a self-testing circuit like LBIST or a test circuit external to the integrated circuit device using, for example, an automatic test pattern generator (ATPG). ATPG is software that creates test patterns. The test patterns are transferred to a test machine, or tool, that may be referred to as automatic test equipment (ATE).

LBIST block 12 is used to test the functionality of functional logic 14. Functional logic 14 may be a very large part of the circuitry on IC 10. During testing, LBIST block 12 scans in a sequence of test patterns to a scan chain to test functional logic 14. For example, one test may be of a logic path including AND logic gate 24 and other logic 26. Other logic 26 may include digital logic and analog or mixed signal circuits. Other logic 26 may also have an output that connects to other logic (not shown). There may be many such paths on IC device 10. A resulting output of the scan test is provided to the scan chain (FIG. 2) and output from the scan chain via multiplexer 36 and flip-flop 38 as scan out (SO) data in response to a scan enable signal SE. In addition to structural testing, LBIST block 12 may provide additional testing that triggers activation of payload 34. Also, LBIST block 12 may provide test patterns that increment counter 30 and will eventually trigger payload 34, and lead to detection of the presence of malicious circuit 22. Conventional production or lab validation testing may not trigger or detect malicious circuit 22 because of the activation delay provided by counter 30 and trigger circuit 32. A test pattern provided to, for example, an input of AND logic gate 24 by LBIST block 12 may not cause the output of AND logic gate 24 to activate trigger circuit 32. This is because prior to activation, the counter bits of counter 30 do not influence resulting scan vectors that are shifted out of a scan chain (see FIG. 2). The disclosed embodiment provides a method for triggering and detecting the existence of malicious circuits on an IC using LBIST block 12 in the field.

In general, scan testing patterns include a relatively high percentage of "don't care" bits. That is, bits or flip-flop states that don't influence a resulting output scan vector that is shifted out of the scan chains. The "don't care" bits can be arbitrarily set to a "1" or a "0". For example, an ATPG tool may set the "don't care" bits to be all "0" or all "1" for a production test. In accordance with one embodiment, the "don't care" bits are pseudo-randomly changed for each scan test run as described below using LBIST in the field.

In accordance with an embodiment, a plurality of test patterns is provided to the scan chain using test pattern generator 18 in an attempt to trigger malicious circuit 22 by a combination of bits. In one embodiment, test pattern generator 18 includes a pseudo-random number generator (PRNG). The PRNG may be, for example, a linear feedback shift register (LFSR). In another embodiment, test pattern generator 18 may include a different type of random number generator, such as for example, a true random number generator (TRNG). Scan out data SO is output from scan chain portion 28 and provided to LBIST engine 16 and test data storage 42. The scan out data is stored in test data storage 42 when testing for malicious circuits. LBIST engine 16 determines when malicious circuit testing occurs by activating scan out data monitoring engine 44 with signal "UNDEFINED SCAN OUT." When attempting to trigger a malicious circuit with test patterns, scan out data monitoring engine 44 receives the scan out data from test data storage 42 and analyses the scan out data to detect when the malicious circuit is triggered and operating. More specifically, scan out data monitoring engine 44 performs a statistical analysis of the undefined scan out values of the scanned logic over time to detect if the undefined scan out values have been modified by payload 34. The statistical analysis is performed on scan out data received over a predetermined period of time. The analysis may include averaging the stored scan out data, a correlation of the stored scan out data to the don't care bits, and an autocorrelation of the undefined scan out values over time. A difference between the stored values from one time period to another time period indicates a malicious payload has been triggered. Averaging may include monitoring a running average. Any change in the running average may indicate malicious circuit 22 has been triggered. In one embodiment, the testing is performed intermittently to an application running on the integrated circuit. The testing may also be run in the background, or in another way intended to minimize interruptions to application processing.

Figure 2:
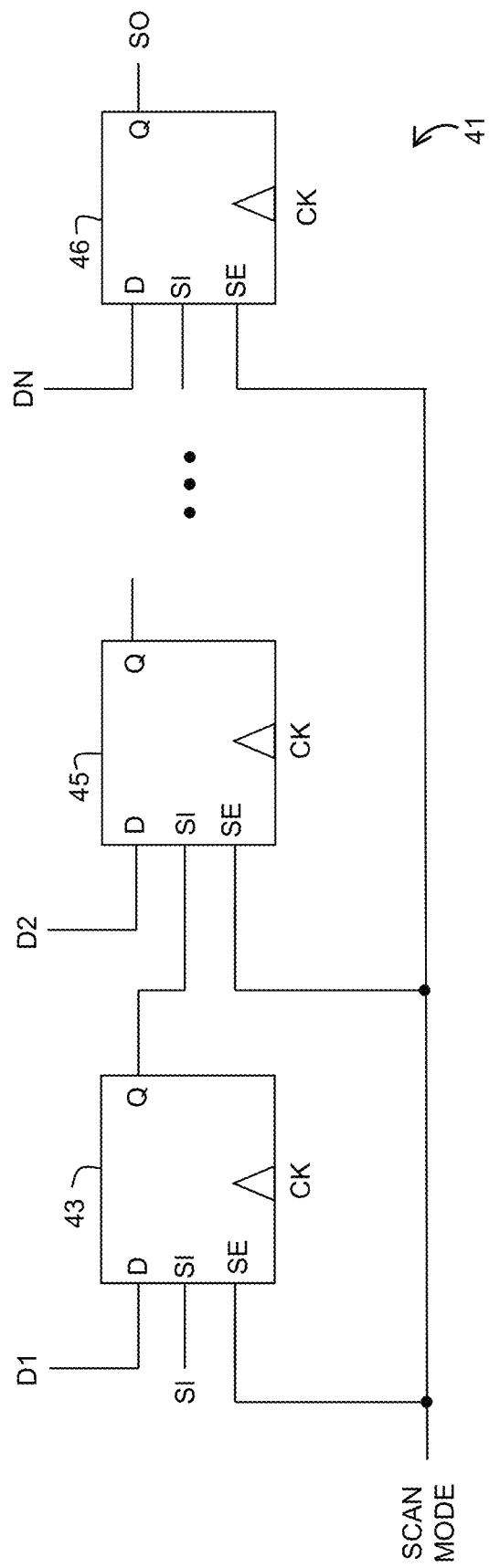
FIG. 2 illustrates a scan chain for use in the integrated circuit device of FIG. 1.

FIG. 2 illustrates scan chain 41 for use in IC device 10 of FIG. 1 in accordance with another embodiment. In FIG. 1, scan flip-flop 28 includes a standard D-flop 38 and a multiplexer 36. In FIG. 2, the scan flip-flop is illustrated as a stand-alone scan flip-flop that already has SI, D, and SE inputs. Either embodiment can be used. Scan chain 41 includes a plurality of serially-connected flip-flops represented by flip-flops 43, 45, and 46. Each flip-flop has a scan-in input (SI), a data input (D) coupled to the combinational logic to be tested, a scan enable input (SE), a clock input (CK), and an output (Q). Each output Q of each flip-flop is coupled to the scan input SI of the next flip-flop. The last flip-flop in the chain provides a scan-out output signal (SCAN OUT). There may be a number of scan chains throughout functional logic 14 depending on where testing is desired.

FIG. 3 illustrates example test patterns for use in triggering and detecting malicious circuit 22 in IC device 10 of FIG. 1. The test patterns are illustrated in the form of scan cell contents. Each scan cell includes a flip-flop (FF). In the test patterns, the scan cells having "don't care" bits are set in, e.g., a pseudo-random manner and varied from one test run to the next. Note that FIG. 3 limits the number of flip-flops in the scan chain to six for simplicity and clarity. In an actual IC, there can be any number of flip-flops. LBIST engine 16 in FIG. 1 calculates and provides a value (VALUE) for each scan cell (FF1-FF6) and a control signal (DON'T CARE) that controls which input of multiplexer 20 is provided to test functional logic 14, for example, to test AND logic gate 24 in the illustrated example. The bit value of the control signal DON'T CARE is determined by whether the scan cell VALUE is a "care" bit or a "don't care" bit. If the scan cell VALUE is a "care" bit, the bit VALUE is set by test pattern generator 18. The value of the "don't care" bits are calculated for each test run and hence the test runs usually differ from one scan run to the next. For example, two tests runs 47 and 48 are applied to AND logic gate 24 as illustrated in FIG. 3. A first test run ($1^{st}$ RUN) includes a first test pattern (PATTERN 1) and a second test pattern (PATTERN 2). A second test run ($2^{nd}$ RUN) also includes PATTERN 1 and PATTERN 2 test patterns. As illustrated, PATTERN 1 of the first test run 47 has two "care" bits and four "don't care" bits, and PATTERN 2 has one "care" bit and five "don't care" bits. The "care" bits of PATTERN 1 stay the same for the first and second scan test patterns of the first and second test runs. However, some of the "don't care" bits are changed between the first and second test runs. For example, in FIG. 3, the output bit of FF3 in PATTERN 2 of the first test run changes from a "0"

to a "1" in PATTERN 2 of the second test run, and the output bit of FF6 in PATTERN 1 of the first test run changes from a "0" to a "1" in PATTERN 1 of the second test run 48. The changing of the "don't care" bits from one scan test run to the next causes many different potential trigger conditions that would not be applied otherwise, for example, in a normal functional scan test. The output SO of the flip-flop 38 would be monitored during the scan test for unexpected responses that may indicate the presence of a malicious circuit such as malicious circuit 22.

Because the type of malicious circuit would generally not be known, the method for triggering and detecting as described may be combined with other methods for testing for other types of malicious circuits. For example, a malicious circuit that is triggered by aging may be tested for by using a different method. Also, a scan test pattern directed to rarely occurring logic states may be created to detect other malicious circuits. In addition, an ATPG-based test point insertion to target functionally unused logic, or testing security-critical functions could be used and combined with the above described tests to trigger and detect various types of malicious circuits.

Figure 4:
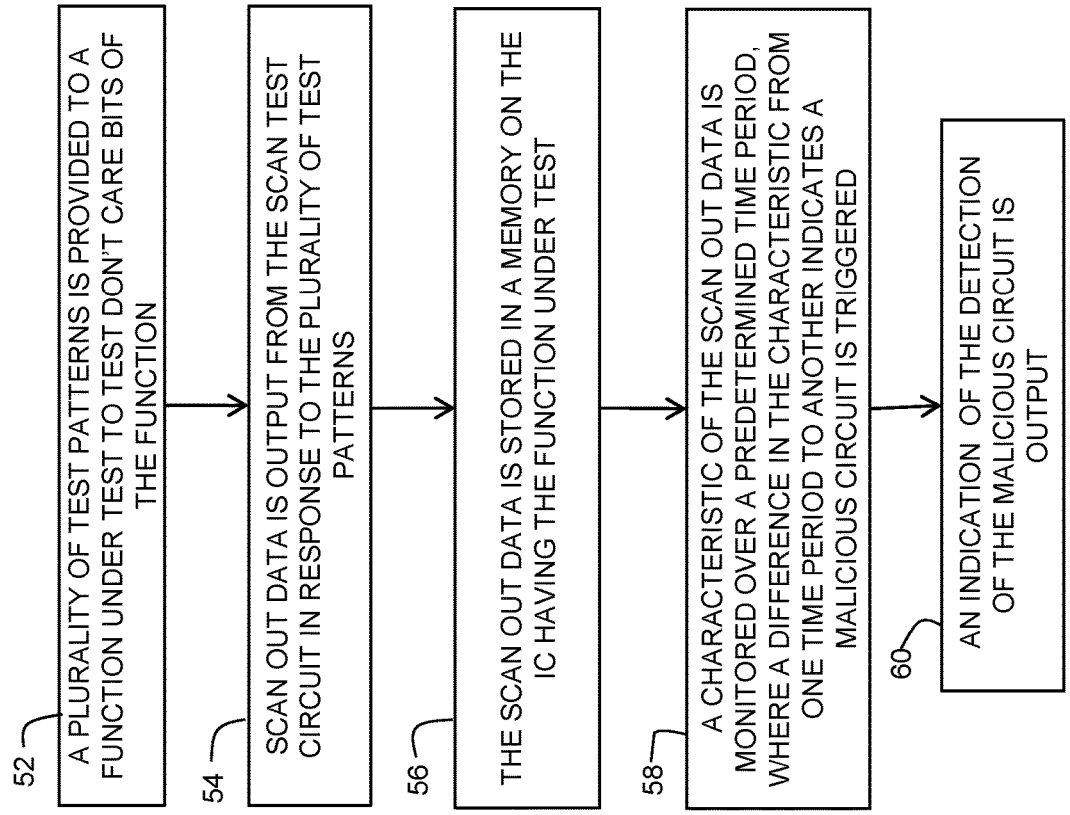
FIG. 4 illustrates a method for triggering and detecting a malicious circuit in the integrated circuit device of FIG. 1.

FIG. 4 illustrates method 50 for detecting a malicious circuit in IC device 10 of FIG. 1. Method 50 starts at step 52. At step 52, a plurality of test patterns is provided to test don't care bits of a function under test on IC device 10. At step 54, scan out data from the scan test circuit is output in response to the plurality of test patterns. At step 56, the scan out data is stored in a memory on IC device 10. In FIG. 1, the memory is test data storage 42 of LBIST 12. At step 58, a characteristic of the scan out data is monitored over a predetermined time period, where a difference in the characteristic from one time period to another time period indicates a malicious circuit is triggered. The characteristic may include one or more of an average value of the stored scan out data, a correlation of the stored scan out data to the don't care bits, and an autocorrelation of the undefined scan out values over time. At step 60, an indication of the detection of the malicious circuit is output so that appropriate action may be taken. The indication may include disabling the function on IC device 10 or disabling the entire IC.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting a malicious circuit on an integrated circuit device, the method comprising:
   providing a plurality of test patterns, using a scan test circuit, to test don't care bits of a function under test on the integrated circuit, wherein a first test pattern of a test run of the plurality of test patterns includes at least one care bit and don't care bits, and wherein a value of each of the don't care bits is determined in a pseudo-random manner;
   outputting scan out data from the scan test circuit in response to the first test pattern;
   changing a value of at least one bit of the don't care bits of the first test pattern of the test run to create a second test pattern of the test run without changing any of the at least one care bit between the first test pattern and the second test pattern, and providing the second test pattern to the function under test of the integrated circuit;
   outputting scan out data from the scan test circuit in response to the second test pattern of the test run;
   monitoring, using a scan out data monitoring engine on the integrated circuit, the don't care bits of the scan out data of the first and second test patterns of the test run, and determining, using the scan out data monitoring engine, if a characteristic of the scan out data received in response to the second test pattern is different from the scan out data received in response to the first test pattern; and
   outputting an indication that a malicious circuit has been detected or is suspected in response to detecting a difference in the characteristic of the scan out data between the first and second test patterns.

2. The method of claim 1, wherein the characteristic of the scan out data further comprises one or more of an average value of the stored scan out data, a correlation of the stored scan out data to the don't care bits, and an autocorrelation of the scan out values over time.

3. The method of claim 1, wherein the don't care bits of the plurality of test patterns are generated pseudo-randomly.

4. The method of claim 1, wherein the scan test circuit is a logic built-in self-test (LBIST) circuit.

5. The method of claim 1, wherein the method is performed by a self-testing circuit on the integrated circuit after production testing and after the integrated circuit has been implemented in a product.

6. The method of claim 1, wherein the method is performed by a self-testing circuit intermittently to an application running on the integrated circuit after the integrated circuit has been implemented in a product.

7. The method of claim 1, wherein the function under test is one of a logic function, or mixed-signal function.

8. The method of claim 1, wherein outputting the indication further comprises disabling functionality of the integrated circuit.

9. The method of claim 1, wherein outputting the indication further comprises disabling functionality of the integrated circuit.

10. A method for detecting a malicious circuit on an integrated circuit device, the method comprising:
providing a plurality of test patterns, using a scan test circuit, to test don't care bits of a function under test on the integrated circuit, wherein a first test pattern of a test run of the plurality of test patterns includes at least one care bit and don't care bits, and wherein a value of each of the don't care bits is determined in a pseudo-random manner;
outputting scan out data from the scan test circuit in response to the first test pattern;
changing a value of at least one bit of the don't care bits of the first test pattern of the test run to create a second test pattern of the test run without changing any of the at least one care bit between the first test pattern and the second test pattern, and providing the second test pattern to the function under test of the integrated circuit;
outputting scan out data from the scan test circuit in response to the second test pattern of the test run;
storing the scan out data in response to the first and second test patterns in a memory on the integrated circuit;
monitoring, using a scan out data monitoring engine on the integrated circuit, the don't care bits of the scan out data of the first and second test patterns of the test run, and determining, using the scan out data monitoring engine, if a characteristic of the scan out data received in response to the first test pattern is different from the scan out data received in response to the second test pattern, wherein the characteristic comprises one or more of an average value of the stored scan out data, a correlation of the stored scan out data to don't care bits, and an autocorrelation of the undefined scan out values over time; and
outputting an indication that a malicious circuit has been detected in response to detecting a difference in the characteristic of the scan out data between the first and second test patterns.

11. The method of claim 10, wherein the don't care bits of the plurality of test patterns are generated pseudo-randomly.

12. The method of claim 10, wherein the scan test circuit is characterized as being a logic built-in self-test circuit.

13. The method of claim 10, wherein the method is performed by a self-testing circuit on the integrated circuit after the integrated circuit has been implemented in a product.

14. The method of claim 10, wherein the method is performed by a self-testing circuit on the integrated circuit intermittently to an application running on the integrated circuit.

15. The method of claim 10, wherein the function under test is one of a logic function or mixed signal function.

16. A device comprising:
a test pattern generator for providing a plurality of test patterns to test don't care bits of a function under test on the device, wherein a first test pattern of a test run of the plurality of test patterns includes at least one care bit and don't care bits, and wherein a value of each of the don't care bits is determined in a pseudo-random manner, wherein a value of at least one bit of the don't care bits of the first test pattern of the test run is changed to create a second test pattern of the test run without changing any of the at least one care bit between the first test pattern and the second test pattern;
a scan test circuit for providing scan out data in response to the first and second test patterns of the plurality of test patterns;
a memory for storing the scan out data; and
a scan out data monitoring engine coupled to the memory for determining if a characteristic of the scan out data received in response to the second test pattern is different from scan out data received in response to the first test pattern, and in response to detecting a change in the scan out data, providing an indication that a malicious circuit has been detected on the device in response to detecting a difference in the characteristic of the scan out data between the first and second test patterns.

17. The device of claim 16, wherein the characteristic of the scan out data that is monitored within the predetermined time period further comprises one or more of an average value of the stored scan out data, a correlation of the stored scan out data to don't care bits, and an autocorrelation of the undefined scan out values over time.

18. The device of claim 16, wherein the device comprises one or more integrated circuits.

19. The device of claim 16, wherein the scan test circuit comprises a logic built-in self-test circuit.

20. The device of claim 16, wherein the test pattern generator provides a plurality of randomly generated test patterns.

* * * * *